Patented Aug. 25, 1953

2,650,174

UNITED STATES PATENT OFFICE 2,650,174

COATED RUBBER HYDROCHLORIDE PRODUCT

Clarence M. Carson, Cuyahoga Falls, Ohio, assignor to Wingfoot Corporation, Akron, Ohio, a corporation of Delaware No Drawing. Application December 6, 1951, Serial No. 260,307

2 Claims. (Cl. 117—139)

This invention relates to an improved rubber hydrochloride film coated with a mixture of rubber hydrochloride, chlorinated rubber and wax.

Although rubber hydrochloride film has found wide use as a packaging material, it has been marketed in film form only. There has been no commercial use of rubber hydrochloride as a coating. The film has been laminated to various sheet materials, but rubber hydrochloride has never been used in solution for coating.

A chief drawback to the use of rubber hydrochloride solutions for coating is that on drying the coating contracts and causes a sheet to which it has been applied to curl or pucker. The coated sheet does not dry flat. There has been no use for these non-flat sheets.

According to this invention chlorinated rubber is incorporated with rubber hydrochloride in a coating solution. A solution of 100 parts of rubber hydrochloride and from 15 to 60 parts or even up to 100 parts of a chlorinated rubber having a viscosity of 5 to 125 centipoises, when applied as a coating dries without curling or puckering. The coating is quite moistureproof, depending upon what other materials, if any, may be present. Adding paraffin or a microcrystalline wax, such as the waxes known commercially as Syncera wax and Superla wax, increases the resistance of the coating to the transfer of water vapor. Up to 40 parts by weight of wax may be used for each 100 parts by weight of rubber hydrochloride, although generally 5 to 15 parts of wax will be used. Adding the usual plasticizers and certain resins or other extenders or fillers, etc. will increase the rate of transfer of moisture through the coating, if such increase is desired.

The coating may be used as an adhesive for attaching labels, etc. to rubber hydrochloride film or laminating rubber hydrochloride film to paper, etc. It may be used for coating a variety of sheet materials such as paper, metal foil, glassine, regenerated cellulose, etc., and different anchoring agents may be employed to increase the adhesion of the coating to the base. The viscosity of the coating solution can be adjusted so as to get minimum penetration in a porous sheet like 40-pound kraft paper, etc. while securing good coverage and anchorage. The coating is heat-sealable to itself and to rubber hydrochloride film.

The coating may be made from rubber hydrochloride film which is composed largely or entirely of scrap. Undesirable plasticizers present in the scrap may be removed by extraction with alcohol or acetone or other solvent. Benzene is a satisfactory solvent but is relatively fast drying, and the use of some toluene with the benzene will generally be found desirable to reduce the rate of evaporation of the solvent from the coating. The chlorinated rubber may be added in solid form directly to the solution of the rubber hydrochloride in the solvent. If the coating is to be prepared from scrap rubber hydrochloride the chlorinated rubber and rubber hydrochloride may be dissolved simultaneously.

Generally the coating will be prepared directly from rubber. The rubber will be broken down on a mill to give a solution of relatively low viscosity. Thus the rubber may be broken down to a plasticity of 75 to 90, as measured by a Williams plastometer, but the invention is not limited to rubber hydrochloride prepared from such rubber because rubber of higher and lower plasticity may be used. The rubber is dissolved in benzene or a mixture of benzene and toluene or other suitable solvent. After hydrochlorinating the solution is neutralized. The neutralization procedure described in Walton 2,237,125 may be employed. After neutralizing, the solution is filtered. The chlorinated rubber and other materials, if any, are then added or they may be added and dissolved in the solution before filtering.

In the following examples there was used chlorinated rubber of 67 per cent chlorine content and sold as Parlon by Hercules Powder Company.

The following examples illustrate the invention:

Example I

| | Parts by weight |
|---|---|
| Rubber hydrochloride | 100 |
| Chlorinated rubber (20 cps.) | 25 |
| Superla wax | 15 |
| Benzene | 400 |
| Toluene | 600 |

This coating may be used satisfactorily on metal foils, glassine paper, parchment paper such as is used in food lockers, and uncoated cellophane, etc. The bond formed with cellophane can be improved by adding to the coating a copolymer of butadiene and acrylonitrile, as will be more fully explained in what follows. The coating of this example was applied on manila paper for use as a bottle cap liner, and paper with a coating .00035 inch thick on testing (using the procedure outlined in Modern Packaging, vol. 19, No. 12, page 146, August 1946) was found to have a WVTR (water-vapor transmission rate) of 1.02 grams/100 sq. in./24 hrs. Rubber hydrochloride film .0008 inch thick and containing no plasticizer was heat laminated to the coated paper. The laminated stock had a WVTR of 0.47 gram/ 100 sq. in./24 hrs.

*Example II*

| | Parts by weight |
|---|---|
| Rubber hydrochloride | 100 |
| Chlorinated rubber (20 cps.) | 55 |
| Superla wax | 20 |
| Benzene | 400 |
| Toluene | 600 |

This coating can likewise be used on glassine, metal foils, parchment, and uncoated cellophane. It gives a better bond to uncoated cellophane than the coating of Example I, due to its higher content of chlorinated rubber. Coated on manila paper with a coating .00035 inch thick, it had a WVTR of 0.86 gram/100 sq. in./24 hrs. When rubber hydrochloride film .0008 inch thick was laminated to the coated paper, the WVTR was reduced to 0.40 gram/100 sq. in./24 hrs.

*Example III*

| | Parts by weight |
|---|---|
| Rubber hydrochloride | 100 |
| Chlorinated rubber (20 cps.) | 25 |
| Benzene | 400 |
| Toluene | 600 |

This formulation was prepared particularly for coating the unprinted side of cheap label paper stock. The coating was applied at the rate of three pounds per three thousand square feet. This coating is heat-sensitive and at a temperature of 285° F. or higher can be laminated to rubber hydrochloride film which contains up to 30 parts of ester plasticizer, such as dibutyl phthalate, butyl sebacate, etc.

*Example IV*

| | Parts by weight |
|---|---|
| Rubber hydrochloride | 100 |
| Chlorinated rubber (20 cps.) | 30 |
| Benzene | 400 |
| Toluene | 600 |

This coating was prepared for use on aluminum foil. Coated at the rate of two to five pounds per three thousand square feet of the foil, it forms a heat-sealable coating and maintains a lower water-vapor transfer rate at folds and creases in the package where pinholes would occur if no coating were present.

The adhesion of the coating to nitrocellulose-coated cellophane, etc. is improved by adding a benzene-soluble copolymer of butadiene and acrylonitrile. Paper and cellophane coated with such copolymer-containing coatings when used for box-liners on to which molten cheese is poured in packaging, give good cheese cling. They are substantially impervious to air and can be used for vacuum-packaging bacon, luncheon meats, etc. Ham packaged in a transparent sheet so coated does not fade rapidly under a fluorescent lamp. Such sheet may be used for packaging butter, lard, fats, etc.

The ratio of the butadiene and acrylonitrile may be varied in making the copolymer, from 50 parts of each to 80 parts butadiene and 20 parts acrylonitrile. Usually 15 to 40 parts by weight of copolymer will be used for each 100 parts by weight of rubber hydrochloride, although up to 60 or even 100 parts by weight of copolymer may be employed. Coatings containing the copolymer will ordinarily contain no more than 60 parts by weight of chlorinated rubber for each 100 parts by weight of rubber hydrochloride.

The following examples refer more particularly to a copolymer prepared from 67 parts butadiene and 33 parts acrylonitrile. The copolymer may be compounded or uncompounded. The compounded copolymer may be vulcanized and makes a less tacky coating than the uncompounded copolymer. An uncompounded copolymer will generally be preferred in adhesives and a compounded copolymer in surface coatings. The copolymer may be compounded for curing in any suitable manner. The following example is illustrative.

*Example V*

| | Parts by weight |
|---|---|
| Copolymer | 100 |
| Sulfur | 3 |
| Magnesium carbonate | 1 |
| Mercaptobenzothiazole disulfide | 0.75 |

The ingredients are mixed on a conventional rubber mill to produce uniform mixing, and preferably with the rolls tightened in order to reduce the plasticity of the copolymer and obtain a material which on subsequent solution in toluene or other solvent will produce a solution of reduced viscosity. It may, for example, have a Williams plasticity of 75 or less. The copolymer is preferably added to the coating as a 20 to 25 per cent solution of toluene.

The following examples make no mention of the solvent employed. Any suitable solvent may be used. For instance, in each example, to each 150 parts by weight of solids one might use (A) 400 parts by weight of benzene and 600 parts by weight of toluene or (B) 400 parts by weight of benzene, 400 parts by weight of toluene, and 200 parts by weight of tetrahydrofurane.

*Example VI*

| | Parts by weight |
|---|---|
| Rubber hydrochloride | 100 |
| Chlorinated rubber (20 cps.) | 33⅓ |
| Compounded copolymer | 33⅓ |

The foregoing materials dissolved in suitable solvent, applied on the nitrocellulose coating on cellophane gave a sheet highly resistant to the passage of water vapor and oxygen. The seal strength of the coating to itself is 500 grams per one inch width. The coating may be applied to paper, aluminum foil, etc.

*Example VII*

| | Parts by weight |
|---|---|
| Rubber hydrochloride | 100 |
| Chlorinated rubber (20 cps.) | 23.3 |
| Compounded copolymer | 23.3 |
| Superla wax | 7.5 |

Dissolved in benzene and coated on nitrocellulose-coated cellophane, the coating had excellent anchorage. The coated surfaces of the sheet could be heat-sealed to one another at 200° F. and higher. The coating had substantially zero oxygen diffusion. It had good cheese cling. With a coating of 5 pounds per 3000 square feet the coated cellophane had a WVTR of 0.70 gram/100 sq. in./24 hrs.

*Example VIII*

| | Parts by weight |
|---|---|
| Rubber hydrochloride | 100 |
| Chlorinated rubber (20 cps.) | 16.6 |
| Compounded copolymer | 16.6 |
| Superla wax | 20 |

Coated on nitrocellulose-coated cellophane, as in Example VII, the sheet has a WVTR of 0.60 gram/100 sq. in./24 hrs. when coated at 7 pounds per 3000 sq. ft. The gas diffusion is substantially zero and the cheese cling is good.

*Example IX*

| | Parts by weight |
|---|---|
| Rubber hydrochloride | 100 |
| Chlorinated rubber (20 cps.) | 33.3 |
| Compounded copolymer | 16.6 |
| Superla wax | 20 |

On nitrocellulose-coated cellophane this gave a clear, non-tacky coating. The coated sheet had a WVTR of 0.66 gram/100 sq. in./24 hrs. when applied at the rate of 5 pounds per 3000 square feet. It had good cheese cling and the gas diffusion rate was substantially zero.

The coatings may be applied by any suitable means such as by transfer rolls, a reverse roll coater, in a dip tank, etc. Drying at about 175° F. or higher will usually be satisfactory. This temperature serves to fuse the ingredients of the coating and results in better clarity, anchorage, and lower WVTR than when lower temperatures are used. The coatings may be heated to prevent thickening, and may be applied at 110–130° F. or thereabouts. With sufficient solvents lower coating temperatures may be used.

The formulae given are illustrative. The formulations may include insoluble filler as well as soluble materials, such as ester gum, terpene resins, coumarone-indene resins, rosin-modified phenol formaldehyde resins, etc., to impart desired properties to the coatings.

What I claim is:

1. Film composed essentially of rubber hydrochloride and having a coating adhering thereto of 100 parts rubber hydrochloride, 15 to 60 parts chlorinated rubber of 67 per cent chlorine content and 5 to 125 centipoises viscosity, and 5 to 40 parts of microcrystalline wax.

2. Film composed essentially of rubber hydrochloride and having a coating adhering thereto of 100 parts rubber hydrochloride, 25 parts chlorinated rubber of 67 per cent chlorine content and 20 centipoises viscosity, and 15 parts microcrystalline wax.

CLARENCE M. CARSON.

References Cited in the file of this patent

UNITED STATES PATENTS

| Number | Name | Date |
|---|---|---|
| 2,077,300 | Abrams et al. | Apr. 13, 1937 |
| 2,142,039 | Abrams et al. | Dec. 27, 1938 |
| 2,150,058 | Frazier | Mar. 7, 1939 |
| 2,170,947 | Habgood et al. | Aug. 29, 1939 |
| 2,426,512 | Large et al. | Aug. 26, 1947 |
| 2,456,454 | Signer | Dec. 14, 1948 |
| 2,522,138 | Schaffer | Sept. 12, 1950 |

FOREIGN PATENTS

| Number | Country | Date |
|---|---|---|
| 604,138 | Great Britain | June 29, 1948 |